Aug. 14, 1928. 1,681,098

M. O. CLARK

OIL STORAGE TANK

Filed July 10, 1926 2 Sheets-Sheet 1

WITNESSES

INVENTOR
M. O. CLARK
BY
ATTORNEYS

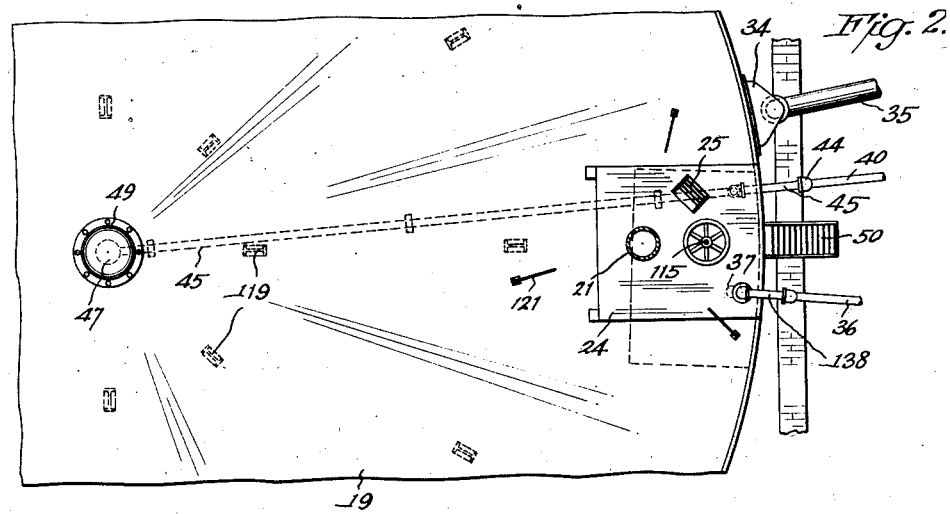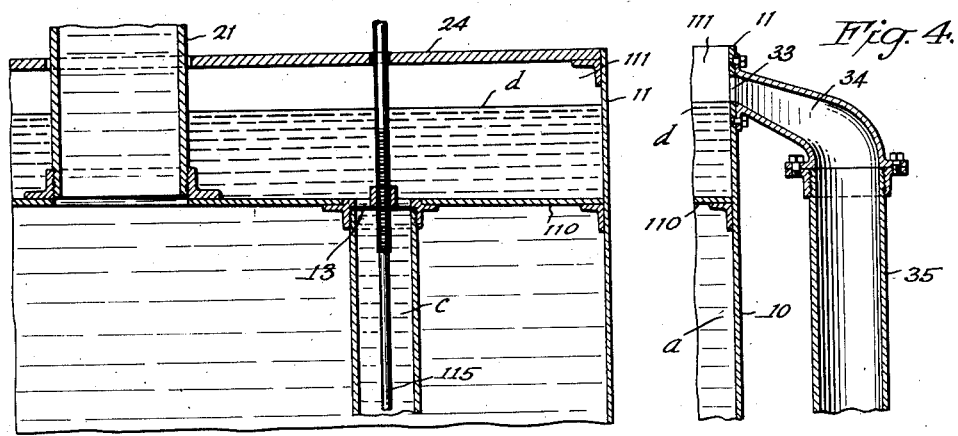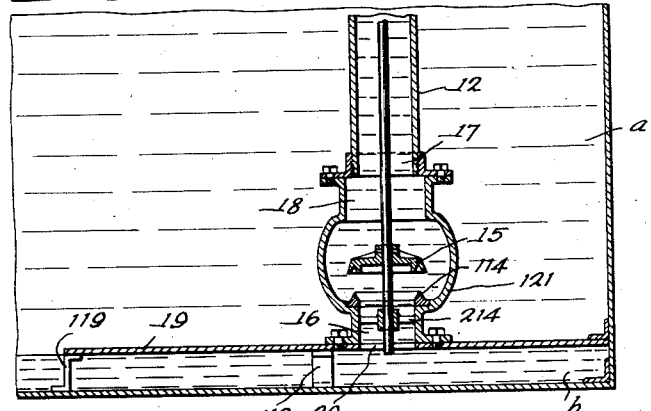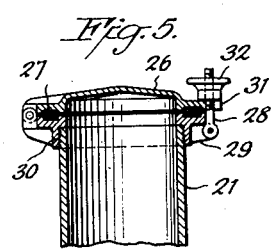

Patented Aug. 14, 1928.

1,681,098

UNITED STATES PATENT OFFICE.

MILTON ONA CLARK, OF CLARKSTON, MICHIGAN.

OIL-STORAGE TANK.

Application filed July 10, 1926. Serial No. 121,595.

My invention relates to storage tanks and particularly to a storage tank adapted for containing liquids of different specific gravities, as for example, water and oil, such as crude oil, fuel oil, kerosene, gasoline, etc., hereinafter referred to as oil.

The general object of my invention is to provide novel and effective means for preventing losses of the oil by evaporation while in storage or at least minimizing the losses.

The manner and means whereby the above and other objects are attained as will appear, will be clearly understood as the description proceeds.

Reference is to be had to the accompanying drawings forming a part of this specification, it being understood that the drawings are merely illustrative of one example of the invention.

Figure 2 is a plan view;

Figure 3 is a vertical section on an enlarged scale of one end portion of a tank;

Figures 4 and 5 are vertical sections of details to be hereinafter referred to.

Figure 1:
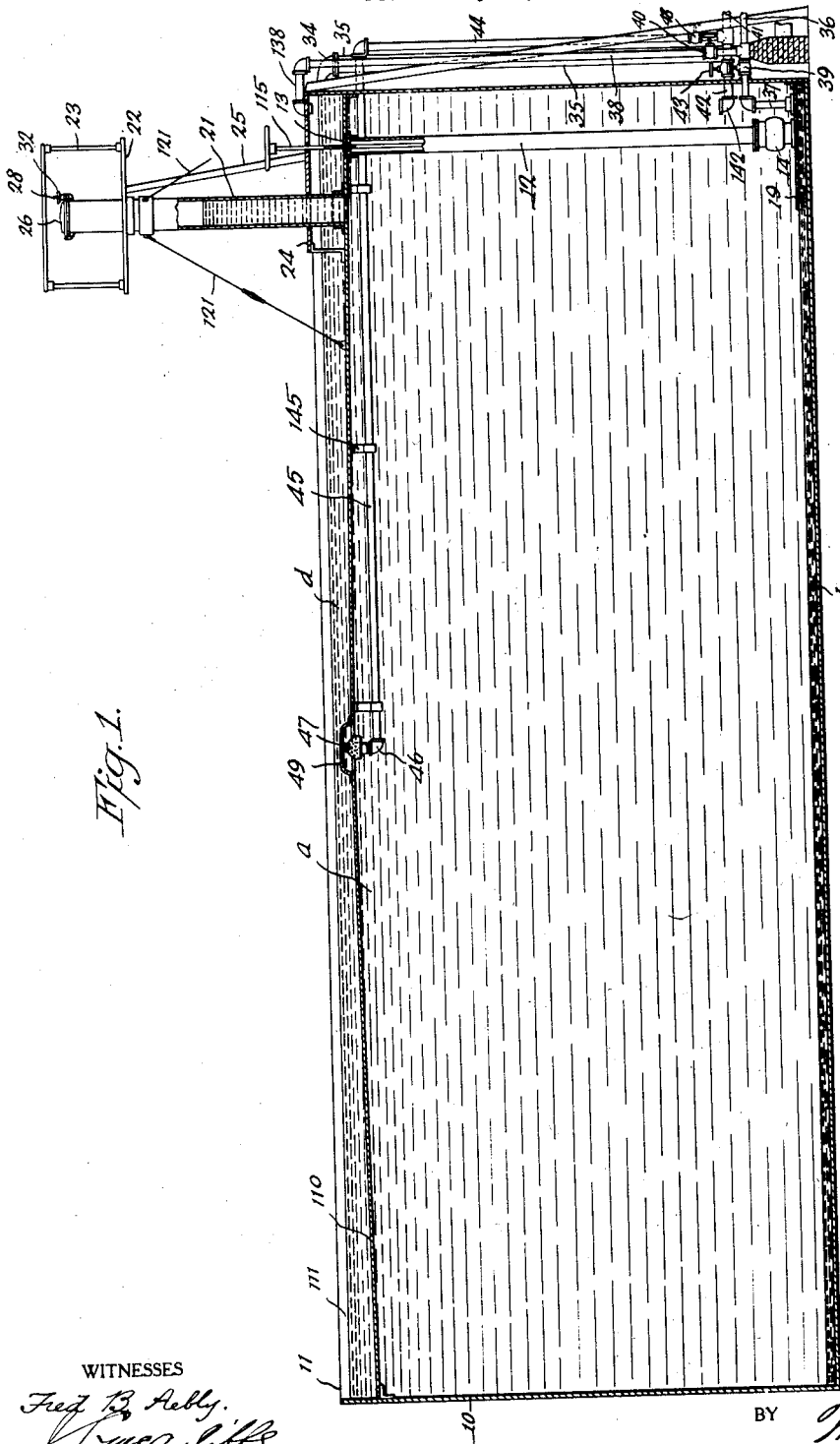
Figure 1 is a longitudinal section of an oil storage tank embodying my invention.

In carrying out my invention in accordance with the illustrated example, a tank 10, adapted to contain oil, is provided. In practice, said tank 10 is usually elongated horizontally and has members 11 above the roof 110 of the tank, said members being advantageously continuations of the sides of the tank. The arrangement provides an auxiliary tank on the roof of the main tank 10, said auxiliary tank adapted to hold water, said water tank being designated 111. A vertical expansion pipe 12 is provided communicating at its upper end with tank 111 through a spider 13 and has threaded engagement therewith so that the turning of valve stem 115 will cause valve 15 to move to or from its seat 114. The inlet 16 at the lower end of valve body 14 preferably has the same capacity as the inlet 17 of expansion pipe 12. The upper end 18 or discharge of the valve body 14 adjacent said inlet 17 is enlarged and has a size sufficient for passing the valve 15 therethrough. The stem 115 has a bearing in the spider 214 below the valve seat 114 and above an opening 20 in a baffle plate 19 provided directly beneath the valve body 14 and sustained by knees 119.

A stack or stand-pipe 21 rises from the roof 110 of oil tank 10 and communicates at its lower end with said oil tank. Near the top of the stand-pipe 21 is a platform 22 surrounded by a railing 23 and near the lower end of the stand-pipe above the roof 110, is a platform 24 from which a ladder 25 rises. The numeral 121 indicates guy wires bracing the stand-pipe 21. The stack or stand-pipe 21 has a hinged closure 26 at the top and a gasket 27 to effect an air-tight closing of the stack. Any suitable fastener for said closure is provided, there being shown a hinge stud 28 pivoted to ears 29 on base 30 of hinge closure 26 which is adapted to swing into a slot 31 on said closure so that a nut 32 on said stud 28 will tighten the closure in position.

The roof tank 111 is provided with a spillway, there being shown for the purpose an overflow outlet 33 in an end wall of the tank. Said overflow outlet 33 is at a height to always maintain a pre-determined level of water in the tank 111, whereby to provide a necessary headway for a hydrostatic column in the expansion tank 12 and a proper cushion of water (b) at the bottom of the pipe as hereinafter referred to. The discharge outlet 33 may discharge to any suitable conductor to carry off the overflow to any desired point, there being shown a neck 34 communicating with said outlet 33 and secured to the waste pipe 35, (see Figure 4). Water is supplied to tank 10 at the bottom, provision in the illustrated purpose being made by a pipe 36 connecting in practice with any suitable source of supply (not shown). Said pipe 36 is shown as having a depending terminal 37 communicating with the tank 10 through the baffle plate 19. Rising from the pipe 36 is a branch pipe 38 which discharges by a branch 138 to the roof tank 111 through the platform 24, see right of Figure 1. The pipe 36 has a cut-off valve 39 between the upwardly extending pipe 38 and the discharge outlet 37 to the tank 10. Also, the upstanding pipe 38 discharging to the roof tank 111 is equipped with a cut-off valve 40.

Oil is supplied to tank 10 as follows: Pipe 41 is adapted in practice to connect with any suitable source of oil supply (not shown) and has a discharge terminal 42 within the tank 10, the terminal having an upturned elbow 142 in practice. Said terminal 42 of the pipe 41 has a cut-off valve 43. Rising from the pipe 41 is a pipe 44 that extends horizontally in the tank 10 adjacent to the roof 110 from which it is supported by hanger brackets 145. On an elbow 46 at the end of pipe 45 is an upstanding rose or perforated head 47. Pipe 44 is equipped with a cut-off valve 48.

In the use of my improved tank, the tank and fittings having responded to all tests, for example, testing for possible leaks in the seams and joints, and assuming the valves are closed, operation will be as follows for receiving, storing and delivering oil.

Receiving.

The valve 39 is opened and the closure 26 is loosened and water is then admitted to the depth of one foot in the tank 10; valve 39 is now to be closed and the valve 43 opened. Oil is admitted to the tank 10 to its full capacity so that the oil is against the roof 110. The valve 43 is now to be closed; the valves 15 and 40 are then opened to admit water until the water body $d$ in the roof tank 111 has reached the level of the overflow 33 for the overflow to pass to the spillway formed by the connection 34 and the waste pipe 35.

Storing.

The operation for filling the tank having been completed as described, valve 40 is then closed and valve 15 is left open. The bodies of water $b$ in the tank; $c$, in the hydrostatic column formed by the rising of the water in expansion pipe 12, and the tank body $d$ will appear as illustrated, the cushion of water $b$ in the bottom being above the level of baffle plate 19, the expansion pipe 12 being filled, and the roof body $d$ of water being at the level of the overflow 33. The oil tank 10 will be solidly filled from the level of the body of water $b$ in the bottom of the tank to the roof 110 of the tank 10. The oil will thus be in contact with all points at the inner surface of the tank roof 110 or top, and assuming the oil to be exceptionally light gasoline having a gravity of 70° Baumé at 60° F., it will rise in the stand-pipe 21 in practice approximately eleven feet above the level of the water body $d$, the height varying with the specific gravity of the oil. The oil level in the stand-pipe 21 will become lower in proportion to the depth of oil in the tank 10 as the quantity of oil in the tank is reduced by withdrawals.

With the described assemblage, the tank will store oil without loss by evaporation with attention only to prevent the exhaustion by evaporation of the water body $d$. A small quantity of oil will evaporate from the oil surface, that is, the exposed area in the stand-pipe 21 and will be held in suspension in the small column of air between the surface of the oil in said stand-pipe 21 and the stand-pipe closure 26. Some of this gas-laden air will be lost each time the closure 26 is raised for gaging the contents of the tank 10 but the net loss of oil will be negligible.

Assuming that oil and water are in the tank 10 as referred to above, and that they have a temperature of 60° F. on the morning that storage commences and that the temperature during the day ranges up to 90° F. and thence back to 60° F. during the night, the contents of the tank will steadily expand until their temperature approaches that of the outside air and the resultant increase in their volume in water will be expelled from the water cushion $b$ past valve 15 and rise in expansion pipe 12 and into the roof body $d$ of the water. During the night when the temperature of the outside air is 60, the temperature of the contents of the tank will tend to undergo a corresponding change and their contraction will cause a resultant difference in volume to pass from the body $d$ down the expansion pipe 12 and back to the water cushion $b$. The provision of the expansion pipe 12 in association with the bodies of water to be maintained at the bottom of the tank 10 beneath the oil and in the roof tank 111 always automatically maintains oil in contact with the roof 110 of the tank where it is not exposed to air and will not evaporate. Therefore, the satisfactory functioning of the tank may be fully realized in climates where freezing does not occur to such an extent as to prevent the circulation of the water bodies or in those cases where the saving in evaporation may warrant the maintenance of an auxiliary heating plant.

Delivering of oil.

In order to deliver oil the valve 48 is opened, thereby admitting oil through the rose or perforated head 47 whence it will flow through pipes 45 and 44 and 41 to the point of filling or loading for delivery. The high level of oil constantly maintained in the described tank greatly facilitates delivery by gravity until the water body $d$ on the roof has passed through the expansion pipe 12 to the water cushion $b$ to such an extent as to leave about six inches maximum depth of water body $d$ which will then be replenished through the pipes 36 and 38. While the run off of oil is continued the replenishing of the body of water $d$ should proceed in compensating volume, leaving at completion of the discharge of oil a maximum depth of one foot, six inches, in the water body $d$. The water cushion $b$ will increase in depth to the extent that the depth of the body of oil is reduced by withdrawals and the height of the column of oil in the stand-pipe 21 will be reduced in proportion to the depth of oil remaining in the tank. After all the oil has been withdrawn, the level in the stand-pipe will be the same as that of the level of the water body $d$ on the roof.

Subsequent supplying of oil to the tank.

When the water level in the bottom of the tank is more than one foot in depth and the remainder of the tank is occupied by oil, further quantities of oil may be admitted by pumping slowly through the pipes 41, 44 and 45 and rose 47, the valve 15 being open to permit of the passing of a like volume of water from the water cushion $b$, through expansion pipe 12 to the water body $d$.

When it is desired to receive oil rapidly under high pressure pumping, the following steps are observed, to wit: Close valve 15, open cover 26, and valve 39 allowing water to run off through pipes 37 and 36 but never reducing the water cushion $b$ to less than one foot in depth. The outflow is continued until the oil surface falls below the roof 110 to the extent required to make room for the quantity of oil to be received. The valve 39 is now closed and the valve 43 having been opened, the pumping of oil may begin through pipes 41 and 42. When the pumping of oil has been completed, valve 43 is closed, and the valve 15 is opened, thereby allowing the water body $d$ to pass to the water cushion $b$ through expansion pipe 12 and thereby again bringing the oil surface into contact with the lower side of the tank roof 110. I now open the valve 40 and restore the body of water $d$ to the roof to its normal working depth of one foot, six inches, at its deepest point.

The closure 26 is now closed as well as all valves with the exception of the valve 15 and storage may be continued for an indefinite period with only occasional attention to the maintenance of the water body $d$ at the roof at a depth of not less than six inches. It will be readily understood that the storage tank described is practically fireproof.

I would here mention that the roof 110 may be in the form of a peak roof. The baffle plate 19 is provided in order to prevent oil being drawn into the pipe 12 when the water cushion is low and the water movement is upward incidental to the expansion, or the receiving of water, or drawn into the pipe terminal 37 when water is being run off to accommodate some oil.

The roof 110 at the small area adjacent to the head or rose 47 is domed or arched as at 49 and the said rose 47 projects partly into the chamber formed by said arched area, the purpose being to maintain oil adjacent the said rose 47 to maintain an ample outflow and at the same time maintain the oil in contact with the whole area of the roof 110. The numeral 50 indicates a ladder leading from the ground to the roof platform 24.

I would state furthermore that while the illustrated example constitutes a practical embodiment of my invention, I do not limit myself strictly to the exact details herein illustrated, since, manifestly, the same can be considerably varied without departure from the spirit of the invention as defined in the appended claims.

Having thus described my invention, I claim:

1. An oil tank including a main reservoir adapted to contain oil, a roof tank on the said reservoir adapted to hold water, means establishing communication between said auxiliary roof tank and the said main reservoir, and a stack rising from the top of the main reservoir and communicating therewith to cause oil to rise in said stack after the oil has risen to the roof of the main reservoir.

2. In an oil tank, a main oil reservoir, a water tank on the roof of said oil reservoir, an expansion pipe extending from near the bottom of the oil reservoir to the said tank to permit expansion of water from the lower portion of the reservoir to said tank and to permit flow of water from said roof tank to said oil reservoir, a water supply pipe extending into the oil reservoir and discharging to near the bottom thereof, and a pipe extending from said water supply pipe to said water tank.

3. In an oil tank, a main oil reservoir, a water tank on the roof of said oil reservoir, an expansion pipe extending from near the bottom of the oil reservoir to the said tank to permit expansion of water from the lower portion of the reservoir to said tank and to permit flow of water from said tank to said reservoir, a water supply pipe extending into the oil reservoir and discharging near the bottom thereof, and a pipe extending from said water supply pipe to said water tank, said last-mentioned pipe having a cut-off valve and said supply pipe having a cut-off valve between the discharge end thereof and said pipe leading to the tank.

4. In an oil tank, a main oil reservoir, a water tank on the roof of said oil reservoir, an expansion pipe extending from near the bottom of the oil reservoir to the said tank to permit expansion of the water in the lower portion of the reservoir to said tank and to permit flow of water from said tank to said reservoir, a water supply pipe extending into the oil reservoir and discharging to near the bottom thereof, and a pipe extending from said water supply pipe to said water tank, said last-mentioned pipe having a cut-off valve and said supply pipe having a cut-off valve between the discharge end thereof and said pipe leading to the tank; together with means to supply oil to the tank, and separate means to withdraw oil from the tank at a point near the roof thereof.

5. In an oil tank, a main oil reservoir, a water tank on the roof of said oil reservoir, a horizontal baffle plate in the oil reservoir near the bottom thereof, and an expansion pipe in communication with said oil reservoir through the said baffle plate and having its upper end in communication with said water tank.

6. In an oil tank, a main oil reservoir, a water tank on the roof of said oil reservoir, a horizontal baffle plate in the oil reservoir near the bottom thereof, an expansion pipe in communication with said oil reservoir through the said baffle plate and having its upper end in communication with said water tank; together with a valve for closing the lower end of said expansion pipe, and a valve stem thereon extending upwardly through the roof of the oil reservoir and through said tank to a point above said tank.

7. An oil tank including a main oil reservoir, an elevated tank for water, an expansion pipe extending from near the bottom of the oil reservoir and communicating at its upper end with said water tank, and oil-supply means comprising a pipe discharging to the oil reservoir remote from the roof thereof, as well as a pipe extending from the oil supply pipe and disposed beneath said roof, adapted for withdrawal of oil from the top of the body of oil in said reservoir.

8. An oil tank including a main oil reservoir, an elevated tank for water, an expansion pipe extending from near the bottom of the oil reservoir and communicating at its upper end with said water tank, an oil-supply pipe discharging to the oil reservoir remote from the roof thereof, and a pipe extending from the oil supply pipe and disposed beneath said roof, adapted for the withdrawal of oil from the top of the body of oil in said reservoir; together with a nozzle on the inner end of said second pipe, said roof adjacent to said nozzle being domed so that the oil rises into contact with the roof of the tank and into said domed portion.

MILTON ONA CLARK.